United States Patent
Chester et al.

(10) Patent No.: US 12,047,413 B2
(45) Date of Patent: Jul. 23, 2024

(54) APPARATUS, METHOD AND COMPUTER PROGRAM PRODUCT FOR IDENTIFYING A SET OF MESSAGES OF INTEREST IN A NETWORK

(71) Applicant: Vocalink Limited, London (GB)

(72) Inventors: Graham David Chester, St. Albans (GB); Syed Asim Ali Shah, Harrow (GB); Sebastian Ix, London (GB)

(73) Assignee: Vocalink International Limited, London (GB)

( * ) Notice: Subject to any disclaimer, the term of this patent is extended or adjusted under 35 U.S.C. 154(b) by 297 days.

(21) Appl. No.: 17/549,448

(22) Filed: Dec. 13, 2021

(65) Prior Publication Data

US 2022/0201035 A1    Jun. 23, 2022

(30) Foreign Application Priority Data

Dec. 22, 2020 (GB) .................................... 2020373

(51) Int. Cl.
*H04L 9/40* (2022.01)
*G06F 18/214* (2023.01)
(Continued)

(52) U.S. Cl.
CPC ........ *H04L 63/1483* (2013.01); *G06F 18/214* (2023.01); *G06N 3/04* (2013.01);
(Continued)

(58) Field of Classification Search
None
See application file for complete search history.

(56) References Cited

U.S. PATENT DOCUMENTS

| 9,294,497 B1 | 3/2016 | Ben-Or et al. |
| 2013/0305356 A1 | 11/2013 | Cohen-Ganor et al. |

(Continued)

FOREIGN PATENT DOCUMENTS

| EP | 3304446 | 12/2016 |
| EP | 3629273 | 1/2020 |
| EP | 3629551 | 4/2020 |

OTHER PUBLICATIONS

UK Search Report for Application No. GB2020373.3 entitled Apparatus, Method and Computer Program Product for Identifying a Set of Messages of Interest in a Network (dated Jun. 22, 2021).

(Continued)

*Primary Examiner* — William J. Goodchild
(74) *Attorney, Agent, or Firm* — Hovey Williams LLP

(57) ABSTRACT

An apparatus, method and computer program product are provided, the apparatus for identifying a set of messages of interest in a network, the apparatus comprising circuitry configured to: receive information of a plurality of sets of messages which have been exchanged by nodes in a network; select a portion of the plurality of sets of messages which have been received using a property of a source message of each set of messages of the plurality of sets of messages; generate individual first values for the nodes of each set of messages of the selected portion of the plurality of sets of messages using a property of the nodes associated with each set of messages; and identify at least one set of messages of the selected portion of the plurality of sets of messages as a set of messages of interest using the individual first values which have been generated for the selected portion of the sets of messages.

17 Claims, 6 Drawing Sheets

(51) Int. Cl.
  *G06N 3/04* (2023.01)
  *G06N 20/00* (2019.01)
  *G06Q 20/38* (2012.01)
  *G06Q 20/40* (2012.01)
  *G06Q 40/02* (2023.01)
  *H04L 51/02* (2022.01)
  *H04L 51/216* (2022.01)

(52) U.S. Cl.
  CPC ........... *G06N 20/00* (2019.01); *G06Q 20/386* (2020.05); *G06Q 20/389* (2013.01); *G06Q 20/4016* (2013.01); *G06Q 40/02* (2013.01); *H04L 51/02* (2013.01); *H04L 51/216* (2022.05); *H04L 63/1416* (2013.01); *H04L 63/20* (2013.01)

(56) References Cited

U.S. PATENT DOCUMENTS

2016/0364794 A1* 12/2016 Chari .................. G06Q 40/02
2018/0181962 A1   6/2018 Barnhardt et al.
2019/0295086 A1   9/2019 Ashiya et al.
2020/0394658 A1  12/2020 Chen

OTHER PUBLICATIONS

International Search Report and Written Opinion for PCT Application No. PCT/EP2021/082023 (Dated Feb. 1, 2022).

\* cited by examiner

1. Seed transaction criteria

2. Scoring accounts*

*Traffic light colours, where red is suspicious

3. Score-based tree-logic

APPARATUS, METHOD AND COMPUTER PROGRAM PRODUCT FOR IDENTIFYING A SET OF MESSAGES OF INTEREST IN A NETWORK

CROSS REFERENCE TO RELATED APPLICATIONS

This application claims priority to United Kingdom Application No. 2020373.3, filed Dec. 22, 2020, which is incorporated herein by reference in its entirety

BACKGROUND

Field of the Disclosure

The field of the present disclosure relates to an apparatus, method and computer program product for identifying a set of messages of interest in a network.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Banking fraud and scamming is an increasing problem. In a typical fraud or scam, a perpetrator of the fraud will illegally obtain funds from a victim's bank account. This may be via a "phishing" or "malware" attack, where access to the victim's banking accounts or facilities is obtained. For example, a perpetrator of a fraud or scam may access a victim's account or deceptively obtain funds via the victim transferring the funds into the perpetrator's bank account.

After the funds have been transferred from the victim's account, the perpetrator will transfer funds through numerous other bank accounts. These other bank accounts may be legitimate bank accounts which have also been compromised, bank accounts set up using illegally obtained documents (such as a stolen or fake passport), or may be bank accounts rented from a third party to be used for illicit purposes.

The speed at which the funds are transferred between these accounts following banking fraud is usually very high. Typically, a transfer between multiple bank accounts may be completed within a few minutes.

The transfer of funds occurs for two reasons. The first reason is to make tracing of funds more difficult. That is, since investigation into banking fraud is often done manually using a limited data view from each bank, it can be difficult to trace the movement of funds originating from an initial fraudulent transaction across the banking network. The second reason is to disperse the money from the initial fraudulent transaction. This allows a perpetrator to use the money more easily without arousing suspicion (such as by withdrawing small amounts of money as cash from an Automated Teller Machine (ATM)).

Published patent applications EP3629273A1 and EP362955A1 describe methods which can build a set of messages through a network. The contents of EP3629273A1 and EP362955A1 are incorporated by reference. In the present disclosure, the contents of EP3629273A1 and EP362955A1 relating to building the set of messages are incorporated by reference. These methods can be used in order to trace the dispersion funds from across a network. That is, related and/or connected messages in the network are identified and established as a unique set of messages within the network.

However, banking networks are very complex and comprise a very large number of individual accounts. Moreover, the number of transactions between the accounts in the banking network can be very high. Indeed, in an economy such as that of the United Kingdom, the number of transactions occurring between accounts could reach a rate of around 300 transactions per second. Owing to the number of transactions and complexity of the banking network, the trail of dispersion of funds from an initial fraudulent transaction can become very complex in a short period of time. Moreover, owing to the number of transactions and the complexity of the banking network, the number of individual sets of messages (individual dispersion trees) which are created can likewise be very large. Therefore, it can become very computationally challenging to distinguish between sets of messages related to legitimate transfer of funds across a banking network and sets of messages which are related to fraudulent activity in the network.

In fact, since scanning the complete network for sets of messages related to fraudulent transactions is very challenging, there are often significant delays between the time at which the fraudulent activity occurs and the time at which the activity is identified as fraud. This delay enables fraudsters to further disperse stolen funds across the network making it even more difficult to stop the fraudsters and retrieve the stolen funds.

It is an aim of the present disclosure to provide a technical solution to address these issues.

SUMMARY

In a first aspect of the present disclosure, an apparatus for identifying a set of messages of interest in a network is provided, the apparatus comprising circuitry configured to: receive information of a plurality of sets of messages which have been exchanged by nodes in a network; select a portion of the plurality of sets of messages which have been received using a property of a source message of each set of messages of the plurality of sets of messages; generate individual first values for the nodes of each set of messages of the selected portion of the plurality of sets of messages using a property of the nodes associated with each set of messages; and identify at least one set of messages of the selected portion of the plurality of sets of messages as a set of messages of interest using the individual first values which have been generated for the selected portion of the sets of messages.

In a second aspect of the present disclosure, a method of identifying a set of messages of interest in a network is provided, the method comprising controlling circuitry to perform the steps of: receiving information of a plurality of sets of messages which have been exchanged by nodes in a network; selecting a portion of the plurality of sets of messages which have been received using a property of a source message of each set of messages of the plurality of sets of messages; generating individual first values for the nodes of each set of messages of the selected portion of the plurality of sets of messages using a property of the nodes associated with each set of messages; and identifying at least one set of messages of the selected portion of the plurality of sets of messages as a set of messages of interest using the individual first values which have been generated for the selected portion of the sets of messages.

In a third aspect of the present disclosure, a computer program product comprising instructions which, when the program is implemented by a computer, cause the computer to perform the steps of: receiving information of a plurality of sets of messages which have been exchanged by nodes in a network; selecting a portion of the plurality of sets of messages which have been received using a property of a source message of each set of messages of the plurality of sets of messages; generating individual first values for the nodes of each set of messages of the selected portion of the plurality of sets of messages using a property of the nodes associated with each set of messages; and identifying at least one set of messages of the selected portion of the plurality of sets of messages as a set of messages of interest using the individual first values which have been generated for the selected portion of the sets of messages.

According to embodiments of the disclosure, sets of messages of interest can be identified within a network with increased processing efficiency and reduced computational effort (with reduction in both processing and memory requirements). Furthermore, the speed at which sets of messages within the network can be identified as sets of messages of interest (being linked to fraudulent, or potentially fraudulent, activity, for example) is significantly increased, such that sets of messages of interest can be identified in substantially real time. Suspicious activity in the network can therefore be identified more efficiently and with higher speed, enabling illicit activity in the network to be disrupted more effectively.

Of course, it will be appreciated that the present disclosure is not limited to the above identified technical effects. Rather, other technical effects will be apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
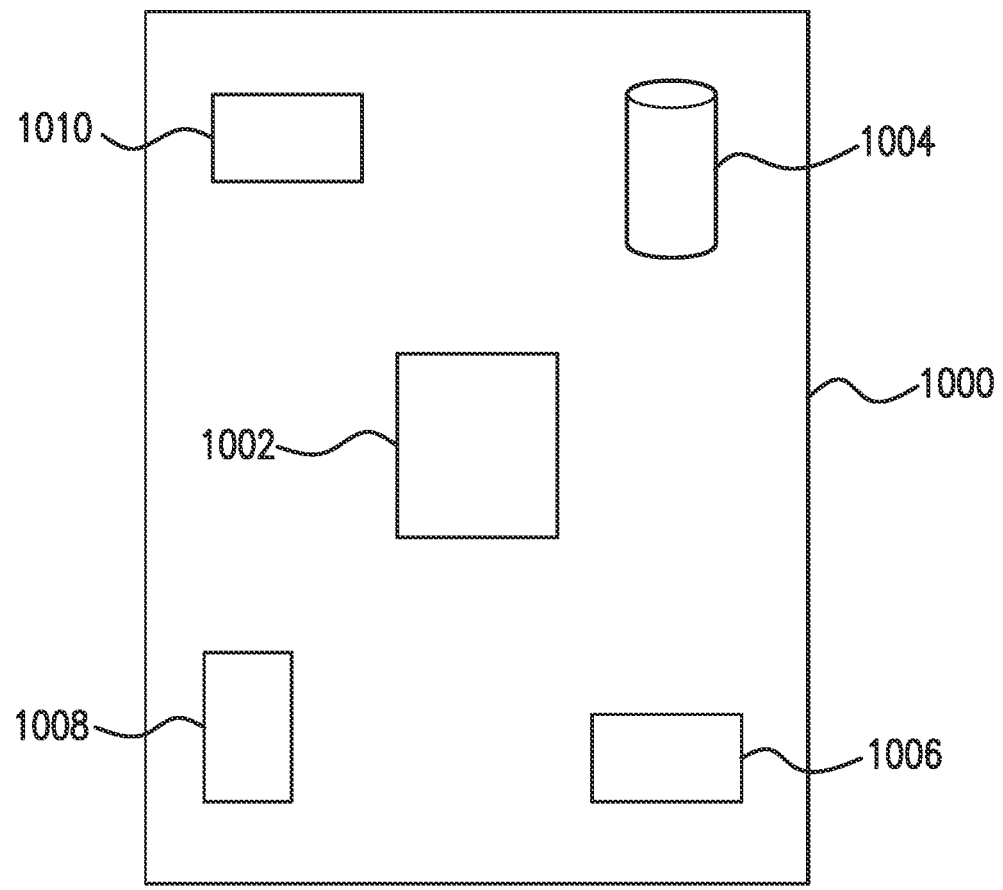
FIG. 1 illustrates an example apparatus in accordance with embodiments of the disclosure.

Referring now to the drawings, wherein like reference numerals designate identical or corresponding parts throughout the several views.

FIG. 1 illustrates an apparatus in accordance with embodiments of the disclosure. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. More generally, the apparatus 1000 is a data processing apparatus.

The processing circuitry 1002 may be a microprocessor carrying out computer instructions or may be an Application Specific Integrated Circuit. The computer instructions are stored on storage medium 1004 which may be a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally connected to the processor circuitry 1002, is a user input unit 1008. The user input unit 1008 may be a touch screen or may be a mouse or stylus type input device. The user input 1008 may also be a keyboard or any combination of these devices. Furthermore, in some examples, the user input unit 1008 may also be a voice input device (such as a microphone device or the like) which is configured to receive sounds (such as a spoken command or the like) as input from a user. Indeed, any form of input device may be used insofar as that device enables a user to provide instruction or other forms of input to the apparatus 1000.

Communication circuitry 1010 is also coupled to the processing circuitry 1002. The communication circuitry 1010 may provide a connection to a Local Area Network or a Wide Area Network such as the Internet or a Virtual Private Network or the like. For example, the communication circuitry 1010 may be connected to infrastructure allowing the processor circuitry 1002 to communicate with other devices or infrastructure equipment in order to obtain or provide relevant data. For example, the communication circuitry 1010 may enable the apparatus 1000 to communicate with financial institutions in a banking network or the like. The communication circuitry 1010 may therefore be behind a firewall or some other form of network security. This improves security of the apparatus 1000 and the data which is processed by that apparatus.

Additionally coupled to the processing circuitry 1002, is a display device 1006. The display device, although shown integrated into the apparatus 1000, may be separate to the apparatus 1000 and may be an electronic display (e.g. liquid crystal display (LCD) or the like) or some kind of device allowing the user to visualise the operation of the system. In addition, the display device 1006 may be a printer or some other device allowing relevant information generated by the apparatus 1000 to be viewed by the user or by a third party.

Figure 2:
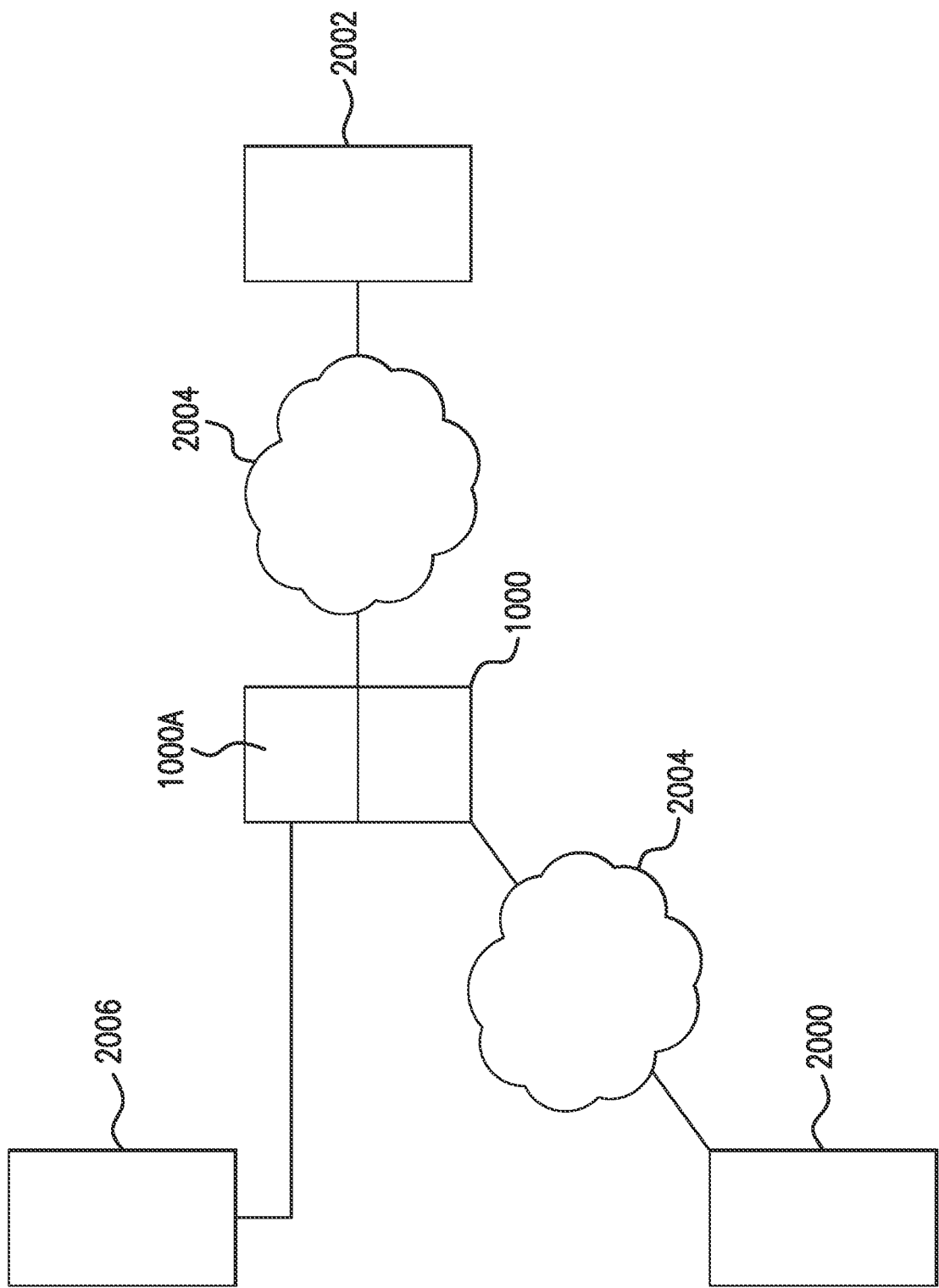
FIG. 2 illustrates an example network to which embodiments of the present disclosure may be applied.

Referring now to FIG. 2, example network to which embodiments of the present disclosure may be applied is illustrated.

In this example illustrated in FIG. 2, a server 1000A is located in a network. The network may be a banking network, for example (however, the present disclosure is not particularly limited in this regard). Additionally, a first device 2000 may be connected to server 1000A over a communication interface 2004 (such as the internet or secure communication or the like). A second device 2002 may also be connected to the server 1000A over a communication interface 2004. This enables the server 1000A to exchange information with each of the first device 2000 and the second device 2002 respectively.

In this example, each of the first and the second device may be a financial institution such as a banking institution or the like. Moreover, each of the first and second device has a number of associated accounts (e.g. bank accounts) which can be used in order to exchange messages with other accounts over the banking network. Accordingly, the accounts which are associated with/held by each of the first and second device form nodes on the banking network. Indeed, in this example, each account may itself be associated with a certain value of funds. The owner of an account may therefore authorise an exchange of a message or messages (i.e. a transaction) in order to transfer a certain portion of those funds from their account to another account on the network. Such a transaction may occur between accounts which are held by an individual financial institution (such as between two accounts held by first device 2000). Alternatively, such a transaction may occur between two accounts which are held by different financial institutions (such as between a first account held by first device 2000 and a second account held by second device 2002).

As such, more generally, messages are digital signals which are sent (or exchanged) between the nodes in the network, and are thus used in order to convey information to other nodes in a network.

Each of the accounts in the network may, in some examples, be identified by a unique account identifier. In the specific example of FIG. 2 of the present disclosure, this unique account identifier may include a bank number and/or sort code for each account.

Now, in this example, whenever there is a message exchanged between accounts (e.g. a transaction between the accounts) server 1000A is notified of the exchange. Such a notification may comprise information such as the source account (being the account from which the transaction originated), the destination account (being the account to which the transaction is directed) and a message value (such as the size or value of the transaction). However, the notification information is not limited to this information. For example, the notification may also include the date and time of the transaction and/or a unique identifier of the transaction, for example. Further information may be included as required.

Once notified of a transaction, server 1000A may store the information in a storage such as an external database 2006. In this manner, every time a message is exchanged between nodes of the network, the server 1000A may add the information regarding the exchange to the database 2006 or other form of storage.

In this regard, individual transactions between bank accounts in this example can be considered as part of a stream consisting of a sequence of transactions between bank accounts of the network. In an economy such as the United Kingdom, the number of transactions between accounts could reach a rate of around 300 transactions per second. In other example networks, the rate of exchange of messages could be even higher than this. As such, the number of transactions recorded between bank accounts in the banking network can be very high. Some of these transactions can be considered as being related to each other (if they occur between linked accounts, for example). However, other transactions are entirely separate (forming instead, a different set of transactions).

In the present disclosure, a set of messages is a collection of messages (or transactions, in this specific example) which are associated, or trace back, to a single source (or root) transaction. A set of messages trace the dispersion of funds through a network. A method for building a set of messages through a network of nodes is described in published patent applications EP3629273A1 and EP362955A1. The contents of EP3629273A1 and EP362955A1 are incorporated by reference. In embodiments, the contents of EP3629273A1 and EP362955A1 relating to building the set of messages (including the specific example of building the dispersion tree) are incorporated by reference. A dispersion tree is a specific example of a set of messages (or transactions) between nodes (or accounts) in a network. Therefore, in some examples, a set of messages may be created as a dispersion tree as taught in published patent application EP3629273A1 and EP362955A1.

The method of building a set of traceable messages through a network of nodes described in EP3629273A1 and EP362955A1 can therefore be used in order to convert the stream of transactions between accounts in a network such as that illustrated in FIG. 2 of the present disclosure into a set of connected transactions, thereby tracing the transfer of funds through the network. When a transaction from the stream of transactions is received (such as a transaction from a first account held by first device 2000 and a second account held by second device 2002), the method comprises determining a set of previous transaction through the network with which the received transaction is associated. The set of previous transactions may be referred to as a dispersion tree. In other words, for each transaction which is received (identified by the unique transaction identifier for each transaction), an outbound message is produced which describes the set of previous messages or transaction the received transaction belongs to or is a member of. This information may also be stored in the external database 2006 or other storage. Therefore, while the transactions are identified and recorded as they occur, analysis of the links between the accounts is not performed at that stage.

It will be appreciated that the present disclosure is not particularly limited to the number of devices (i.e. the first and second device) illustrated in this example. Indeed, in a banking network, for example, there may be significantly more devices than illustrated in FIG. 2 of the present disclosure. Moreover, the method of building a set of traceable messages through the network (such as transactions between bank accounts in the banking network) is not particularly limited to the example method described in published EP3629273A1 and EP362955A1. Indeed, any suitable method may be used in order to trace the transactions through the network and build sets of messages (for related and/or linked dispersion) as required depending on the situation to which embodiments of the disclosure are applied.

Owing to the number of transactions and complexity of the banking network, the trail of dispersion of funds from an initial fraudulent transaction can become very complex in a short period of time. Moreover, owing to the number of transactions and the complexity of the banking network, the number of individual sets of messages (individual dispersion trees) which are created can likewise be very large. Therefore, it can become very computationally challenging to distinguish between sets of messages related to legitimate transfer of funds across a banking network and sets of messages which are related to fraudulent activity in the network.

Moreover, since scanning the complete network for sets of messages related to fraudulent transactions is very computationally challenging, there are often significant delays between the time at which the fraudulent activity occurs and the time at which the activity is identified as fraud. This delay enables fraudsters to further disperse stolen funds across the network making it even more difficult to stop the fraudsters and retrieve the stolen funds.

Consider, for example, a banking network such as that of an economy such as that of the United Kingdom. Here, the number of transactions occurring between accounts could reach a rate of around 300 transactions per second. These transactions may relate to a number of different sets of messages (dispersion trees) across the banking network. Therefore, even though the different dispersion trees may be created as the stream of transactions in the network is consumed, it can be very difficult to identify sets of messages which are related to fraudulent or potentially fraudulent activity (as a high number of the sets of messages may instead relate to the legitimate transfer of funds across the network). Put another way, it will be appreciated that scanning (or otherwise investigating) all the individual sets of messages occur within a network (such as the payment network of the United Kingdom) for illicit activity is very computationally challenging requiring high computational effort and resources (such as processing power and storage requirements). As such, suspicious sets of messages (related to fraudulent or potentially fraudulent dispersion of funds across the network) can often go undetected, or remain undetected for a significant period of time, allowing fraudsters to rapidly disperse the funds across the network. This makes disruption of fraudulent activity and recovery of stolen funds very difficult.

For at least these reasons (and those explained in the background of the disclosure) a technical solution which can address these issues is desired. Accordingly, an apparatus, method and computer program product for identifying sets of messages of interest in a network is provided by the present disclosure.

<Apparatus>

Figure 3:
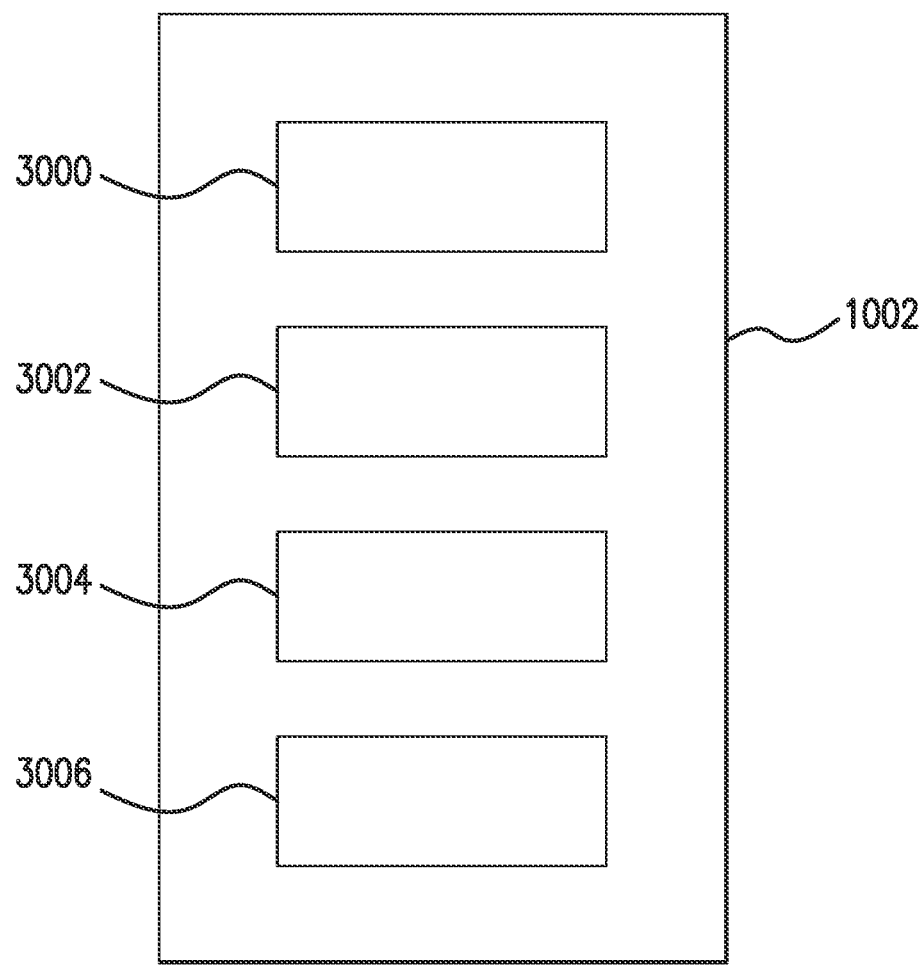
FIG. 3 illustrates an example configuration of an apparatus in accordance with embodiments of the disclosure.

FIG. 3 illustrates an example configuration of an apparatus in accordance with embodiments of the disclosure. That is, the configuration shown in FIG. 2 may be the configuration of an apparatus 1000 such as that described with reference to FIG. 1 of the present disclosure, where the processing circuitry 1002 of apparatus 1000 is configured to comprise a receiving unit 3000, a selecting unit 3002, a generating unit 3004 and an identifying unit 3006.

Specifically, according to certain embodiments of the disclosure, the receiving unit 3000 may be configured to receive information of a plurality of sets of messages which have been exchanged by nodes in a network. Then, the selecting unit 3002 may be configured to select a portion of the plurality of sets of messages which have been received using a property of a source message of each set of messages of the plurality of sets of messages.

The generating unit 3004 of apparatus 1000 may be configured to generate individual first values for the nodes of each set of messages of the selected portion of the plurality of sets of messages using a property of the nodes associated with each set of messages.

Finally, the identifying unit 3006 may be configured to identify at least one set of messages of the selected portion of the plurality of sets of messages as a set of messages of interest using the individual first values which have been generated for the selected portion of the sets of messages.

In this manner, the apparatus according to embodiments of the disclosure is able to identify sets of messages of interest within a network with increased processing efficiency and reduced computational effort (with reduction in both processing and memory overheads and requirements). However, the present disclosure is not particularly limited to these advantageous technical effects. Further technical effects may be achieved by the embodiments of the disclosure are will become apparent when reading the present disclosure.

Further details regarding the apparatus of the present disclosure are described with reference to FIGS. 4 to 6 of the present disclosure.

<Receiving Unit>

As explained with reference to FIG. 3 of the present disclosure, the receiving unit 3000 is configured to receive information of a plurality of sets of messages which have been exchanged by nodes in the network.

Consider, again, the example situation as described with reference to FIG. 2 of the present disclosure. Here, in this example, the nodes in the network are individual accounts in the banking network, and the messages which are exchanged between nodes are transactions between the accounts. These transactions may be used in order to transfer funds (i.e. money) across the banking network. As such, more generally, nodes are individual entities, points or intersections in the network, which can exchange messages with other nodes in the network.

In the present disclosure, a set of messages is a collection of messages (or set of transactions, in this specific example) which are associated, or trace back, to a single source (or root) transaction. As such, each set of messages trace the specific dispersion of funds through a network from an initial source transaction. It will be appreciated that apparatus 1000 need not, itself, construct the sets of messages which develop in the network. Rather, receiving unit 3000 receives information of the sets of messages within the network, with those sets of messages having been constructed (or generated) by an external device such as server 1000A described with reference to FIG. 2 of the present disclosure.

Indeed, a method of building a set of messages through a network of nodes is described in published patent applications EP3629273A1 and EP362955A1. A dispersion tree is a specific example of a set of messages (or transactions) between nodes (or accounts) in a network. Therefore, in some examples, a set of messages may be created, by an external server 1000A, as a dispersion tree as taught in published patent application EP3629273A1 and EP362955A1.

In some examples, the receiving unit 3000 may then receive the information regarding the sets of messages directly from the server 1000A. This may be via any suitable wired and/or wireless connection with the server 1000A. However, in other examples, the server 1000A may store the information regarding the sets of messages in a storage unit which is linked, or otherwise accessible, by receiving unit 3000. Then, receiving unit 3000 can receive or acquire the information regarding the sets of messages from the storage unit.

In certain examples, the information regarding the sets of messages may be a unique identifier for each of the individual sets of messages which have been created. This unique identifier (such as a tree identification number, for example) can then be used by receiving unit 3000 in order to retrieve further information regarding each set of messages as required (using a look-up table storing information related to each tree in association with the unique identifier, for example). However, in other examples, the information received by receiving unit 3000 can include the unique identifiers of the accounts forming a given set of messages and/or the unique identifiers of messages linked to that set of messages which have been exchanged between the accounts. This information enables the apparatus 1000 to construct a complete picture of the dispersion of funds related to each set of messages which has occurred in the network. Further information, such as the properties of messages and/or accounts which are associated with the set of messages may also be received by the receiving unit 3000. The present disclosure is not particularly limited in this respect.

The receiving unit 3000 may be configured to receive the information at any time after it has been created. In some examples, the receiving unit 3000 may be configured to receive the information of the plurality of sets of messages once an investigation to identify fraudulent activity in the network has been started. In other examples, the receiving unit 3000 may receive the information at regular and/or continuous intervals of time. This ensures that the receiving unit is updated with the most relevant information regarding the sets of messages which have been exchanged within the banking network, thus improving the accuracy and reliability of the identification of sets of messages of interest within the network. Indeed, in particular examples, the receiving unit 3000 may receive updated information for a given set of messages as further messages related to that set of messages are exchanged within the network.

It will be appreciated that, generally, the plurality of sets of messages may relate to all individual sets of messages which have been established in the network. In this manner, network wide investigations into fraudulent and/or potentially fraudulent activity can be performed by apparatus 1000. However, in other examples, the plurality of sets of messages may relate to only a portion of the sets of messages in the network. These may relate to sets of messages for which the most recent exchange of messages has occurred within a predetermined period of time, for example. This enables investigation into fraudulent and/or potentially fraudulent activity to be restricted to only the active sets of messages within the network. Sets of messages which have remained inactive for an extended period of time (seeing no further exchange of messages) may, in some examples, be discounted from further investigations, particularly if it has already been determined that those sets of messages are not sets of messages of interest.

In some examples, the receiving unit 3000 may transfer the information regarding the sets of messages which have been received to the selecting unit 3002 when all the information regarding the sets of messages has been received. However, in other examples, the receiving unit 3000 may transfer the information regarding each set of messages to the selecting unit 3002 individually once the information for a given set of messages has been received. This facilitates efficient parallel processing of the information which has been received, thus further improving the processing efficiency of identification of a set of messages of interest in the network. However, the present disclosure is not particularly limited to either of these methods of transferring the information which has been received to the selecting unit 3002. Any suitable method may be implemented, as required, depending on the specific situation to which the embodiments of the disclosure are applied. Indeed, in some examples, the receiving unit 3000 may store the information regarding the sets of messages which have been received in a storage unit which is either internal or external to the apparatus 1000, such that the information can be obtained from the storage unit by the selecting unit 3002 as required.

Accordingly, in this manner, the receiving unit 3000 receives information of a plurality of sets of messages which have been exchanged by nodes in the network.

<Selecting Unit>

The selecting unit 3002 is configured to select a portion of the plurality of sets of messages which have been received using a property of a source message of each set of messages of the plurality of sets of message.

As explained when describing the receiving unit 3000 in relation to FIG. 3 of the present disclosure, the selecting unit 3002 may be configured to obtain the information regarding the plurality of sets of messages which has been received by the receiving unit 3002 as required such that this information may be used in order to select a portion of the sets of messages which have been received.

In particular, the selecting unit 3002 may use this information in order to select a portion of the sets of messages of interest for which the source messages, being the first message in the set of messages, exhibits one or more certain properties. Sets of messages for which the source message exhibits these properties may be considered as strong candidates for sets of messages of interest (e.g. sets of messages for which there is a high risk that the set of messages is related to fraudulent and/or money laundering activity) while sets of messages for which the source message does not exhibit these properties are highly unlikely to be sets of interest. Therefore, only sets of messages for which the source message exhibits these properties should be selected for further processing by the selecting unit 3002 of apparatus 1000.

Figure 4:
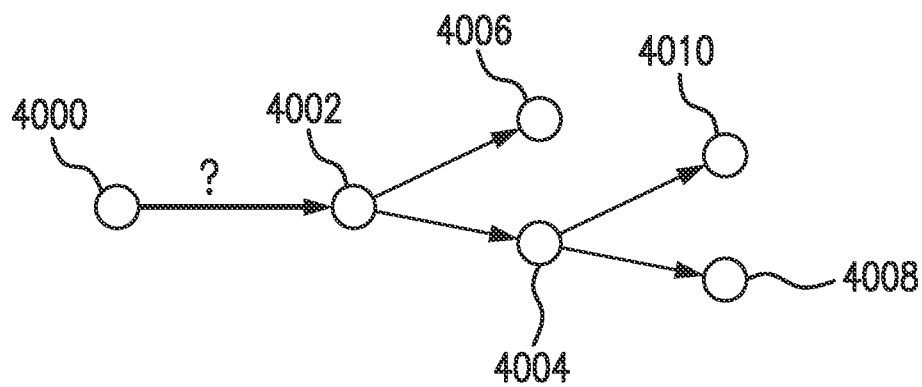
FIG. 4 illustrates an example set of messages in accordance with embodiments of the disclosure.

Consider, now, FIG. 4 of the present disclosure. FIG. 4 illustrates an example set of messages in accordance with embodiments of the disclosure.

Here, in this example, the set of messages illustrated in FIG. 4 comprises a source node 4000, a second node 4002 and a plurality of further nodes 4004, 4006, 4008 and 4010. Information regarding this set of messages (including information regarding the nodes 4002 to 4010 and the messages exchanged between those nodes) may have been received by receiving unit 3000 of apparatus 1000.

In this example, the node 4000 is the source node because it is the node from which the first message associated with the set of messages originated. That is, the message sent from source node 4000 to the second node 4002 (e.g. the target node) is the first message associated with the set of messages illustrated in FIG. 4 of the present disclosure. All other messages associated with this set of message (such as the messages send between node 4002 to node 4004) follow this initial message (the source message) from the source node. Therefore, the message which is sent from node 4000 to second node 4002 is the source message in this set of messages illustrated in FIG. 4 of the present disclosure.

Hence, more generally, a source message is an individual seed message (being the earliest message associated with the set of messages) for each set of messages. In the specific example where the nodes are accounts in the banking network (such as the situation described with reference to FIG. 2 of the present disclosure) the source message is the first transaction between accounts in a dispersion tree.

According to embodiments of the disclosure, one or more properties of this source message can be used, by the selecting unit 3002, in order to select a portion of the sets of messages which have been received. In examples, the selected portion of the sets of messages are those sets of messages which, based on a property of the source message, are candidates for sets of messages of interest. Sets of messages which are not selected by the selecting unit 3002 in this manner are those sets of messages for which a property of the source message is such that it indicates that the sets of messages are not candidates for sets of messages of interest. Therefore, the selecting unit 3002 of the present disclosure is configured to use a property of the source message of each of the sets of messages which have been received as an efficient filter which can be used to select a portion of the sets of messages as candidate sets of messages of interest.

The property of the source message which can be used by the selecting unit 3002 in order to perform the selection of a portion of the sets of messages which have been received is not particularly limited in accordance with embodiments of the disclosure. That is, any property of the source message which indicates that the set of messages is a candidate set of messages of interest can be used in accordance with embodiments of the disclosure. In examples, the property of the source message may be any property which indicates that the source message (i.e. the first transaction in a given set of messages) is an untrusted message. If the source message in a set of messages is an untrusted message (i.e. the message between the source node 4000 and the second node 4002 in the example of FIG. 4) then the entire subsequent dispersion of messages through the network (i.e. the entire set of messages between nodes 4000 to 4010) must be considered as a candidate for a set of message of interest by the selecting unit 3002.

In some examples, a given message may be considered to be an untrusted message if it occurs between two nodes for which the earliest transaction between those nodes occurred less than a predetermined amount of time before the given message.

As such, in the example illustrated in FIG. 4 of the present disclosure, the source message between source node 4000 and the second node 4002 (i.e. the target node) will be considered as an untrusted message if the earliest message between node 4000 and the second node 4002 occurred less than a predetermined amount of time before the source message. Alternatively, the source message will be considered as an untrusted message if no prior message between node 4000 and node 4002 has occurred. Here, it will be appreciated that while two nodes (e.g. node 4000 and node 4002) have exchanged a previous message, that previous message may relate to an entirely independent set of messages (or dispersion tree within the network). As such, when determining whether a source message of a given set of messages is an untrusted message, any message sent between the two nodes (from any set of messages) is considered in order to determine whether the earliest message between the two nodes occurred less than a predetermined amount of time before the source message of the given (or current) set of messages.

Other ways of identifying that the source message is an untrusted message can be used in accordance with the situation to which the embodiments are applied. Furthermore, other properties of the source message can be used (including any property of the source message which indicates that the source message (and thus the set of messages originating from that source message) is a message of interest).

Consider the specific situation described with reference to FIG. 2 of the present disclosure. Here, the nodes are accounts in a banking network, and the messages are transactions between those accounts. Typically, legitimate accounts (operated by their genuine owner for legitimate purposes) exhibit certain behaviours which distinguish those accounts from fraudulent accounts (that is, accounts which are being used for fraudulent and/or money laundering purposes). In particular, legitimate accounts often exhibit stable relationships with other accounts in the network. For example, a legitimate account often makes repeated payments to certain other accounts within the network. These may be payments to other parties with which the owner of the account has an ongoing financial relationship (e.g. family members or the like, for example). Repeated payments to another account in the network which are made over a significant period of time are therefore highly unlikely to be linked to fraudulent behaviour. Accordingly, if a set of messages (or dispersion tree) begins with a trusted message (i.e. a message between two accounts which share a stable financial relationship) then the set of messages is very unlikely to be a set of messages of interest (linked to fraudulent, or potentially fraudulent activity) and can therefore be discounted from further processing by apparatus 1000.

In contrast, as explained with reference to FIG. 2 of the present disclosure, in fraudulent activity (such as money laundering or the like) funds are often rapidly transferred across the network in a series of transactions. These transactions are often made between 'mule accounts' which share no previous financial relationship. Indeed, these 'mule accounts' may have been established for the purpose of rapidly distributing funds across the network. This behaviour (a number of rapid transactions between accounts) is made in order to quickly disperse funds across the network and to obscure the path and location of the funds. Accordingly, when a transaction occurs between two accounts which have no historic relationship, that transaction must be considered as an untrusted transaction, since such behaviour is often linked to fraudulent activity. Sets of messages which begin with an untrusted relationship are strong candidates for sets of messages of interest from amongst the sets of message which have been received by the receiving unit 3000.

Of course, not every transaction which occurs between accounts which do not have a historic relationship will be a fraudulent transaction. There may be legitimate reasons why an account owner makes a payment (or transaction) to another account in the network with which they do not share a historic relationship. However, the majority of legitimate transactions will be made between accounts which share a historic relationship. In contrast, fraudulent transactions very rarely occur between two accounts which share a historic relationship. Moreover, if the untrusted message does not occur at the start of the set of messages, the set of messages should not be considered as a set of messages of interest. That is, sets of messages of interest (i.e. high risk sets of messages) are most likely to begin with an untrusted message, as a fraudster attempts to rapidly transfer stolen funds away from a victim's account.

Therefore, selecting a portion of the sets of messages in this manner, based on a property of the source message (such as whether the source message of each set of messages is a trusted message) provides an efficient mechanism for selecting those sets of messages which are, potentially, sets of messages of interest (i.e. candidate sets of messages). This is because only those sets of messages which begin with a source message having a certain property (e.g. the untrusted sets of messages) are sets of messages which may be considered sets of messages of interest. Therefore, the other sets of messages can be discounted from further processing.

Accordingly, a set of messages which begins with a source message having a certain property (e.g. being an untrusted message) should be considered as a set of messages which is a candidate for a set of messages of interest, whereas sets of messages which begin with a source message not having that property (e.g. being trusted source messages) can therefore be discounted as candidate sets of message of interest in accordance with embodiments of the disclosure.

In some examples, of the present disclosure, the predetermined time period for the earliest messages between two nodes can be set at any predetermined time period. Then, any source message which occurs between two nodes for which the earliest message between those nodes occurred less than this predetermined time period before the source message will be considered as an untrusted message. In particular, filtering the sets of messages based on a property of the source message in this regard has been found to be an efficient and reliable rule that removes approximately 80% of the sets of messages. That is, of all of the sets of messages in the network, only 20% of the sets of messages will be selected by the selecting unit 3002 following this example.

However, the present disclosure is not particularly limited to any example period of time. The period of time for the earliest message between nodes may be adapted to be longer or shorter depending on the type of network to which the embodiments of the disclosure are applied. The period of time can therefore be adapted in accordance with embodiments of the disclosure as required.

Moreover, while the property of the message has been described in detail with an example as to whether the source message is considered trusted or untrusted message based on an analysis of the earliest message which has been exchanged between the source node and the second node in the dispersion tree, it will be appreciated that the present disclosure is not particularly limited in this regard. That is, in some examples, a different property of the source message may be used in order to select a portion of the sets of interest by the selecting unit 3002. Indeed, in some examples, wherein the selecting unit 3002 of apparatus 1000 may be configured to select a portion of the plurality of sets of messages which have been received by selecting sets of messages where a value associated the source message of each set of messages exceeds a first predetermined threshold. That is, in some examples, sets of messages (or dispersion trees) which occur with a high value (and therefore high risk) transaction may be selected as sets of messages of interest. This ensures that the most high risk sets of messages are selected by the selecting unit 3002 as candidate sets of messages of interest, thus further improving the accuracy and reliability when identifying sets of messages of interest in the network. These additional properties of the source message can be used in combination, or independently, from the selection based on an analysis of the earliest message which has been exchanged between nodes in the network.

It will be appreciated that, in theory, the selected portion of sets of messages may comprise all those sets of messages which have been received by the receiving unit 3000. This may occur where all the sets of messages which have been received meet the criteria for selection based on the property of the source message. However, in many examples, the portion of the sets of messages which are selected by the selecting unit 3002 may be significantly less that all the sets of messages which have been received. Indeed, the criteria for selection imposed by the selecting unit 3002 based on the property of the source message should be set, based on the situation to which the embodiments of the disclosure are applied, such that only the most likely candidates for sets of messages of interest are selected (while sets of messages which are very unlikely to relate to fraudulent (or otherwise illicit) activity in the network are not selected by the selecting unit 3002). Indeed, in general, it is found that of all of the sets of messages in the network, only 20% of the sets of messages will be selected by the selecting unit 3002 for further processing.

Therefore, by applying a criteria to select a portion of the sets of messages from amongst the sets of messages which have been received in this manner (based on a property of the source message) the selecting unit 3002 is able to efficiently and reliably remove those sets of messages which are very unlikely to be sets of messages of interest, leaving only those sets of messages which are strong candidates as being sets of messages of interest (linked to fraudulent or potentially fraudulent activity, for example). Accordingly, the selecting unit 3002 of apparatus 1000 is able to precisely and efficiently reduce the number of sets of messages which have been received. This reduces the processing and storage overheads which are required in order to identify whether a set of messages is a set of messages of interest.

Accordingly, in this manner, a portion of the plurality of sets of messages which have been received can be selected by the selecting unit 3002 as being sets of messages which are potentially linked to fraudulent activity.

<Generating Unit>

As described with reference to FIG. 3 of the present disclosure, the generating unit 3004 of apparatus 1000 may be configured to generate individual first values for the nodes of each set of messages of the selected portion of the plurality of sets of messages using a property of the nodes associated with each set of messages.

Indeed, once the selecting unit 3002 has selected a portion of the messages which have been received (being those sets of messages which begin with a source message conforming to a given criterion) the generating unit 3004 produces first values (e.g. a score) for the nodes of all the remaining sets of messages, the first values being indicative of the likelihood that the set of messages is a set of messages of interest (based on the values of the nodes). However, since the generating unit 3004 need only generate the score for the selected portion of the sets of messages of interest (being those sets of messages which have been selected by the selecting unit 3002), as opposed to all those messages which have been received by the receiving unit 3000, a significant reduction in the amount of processing which must be applied by the generating unit 3004 can be achieved, thus further improving the processing efficiency of the identification of sets of messages of interest in accordance with embodiments of the disclosure.

The generating unit 3004 of the present disclosure is configured to generate the first values for the nodes of each of the sets of messages of the selected portion of the plurality of sets of messages which have been received based on an analysis of the properties of the nodes of the sets of messages as a whole. This is in contrast to the selecting unit 3002, which, as explained with reference to FIG. 4 of the present disclosure, is configured to select the selected portion of the sets of messages based on a property of the source messages of those sets of messages alone.

In particular, according to embodiments of the disclosure, the generating unit 3004 of apparatus 1000 is configured to generate first values (or scores) for the nodes of a given set of messages of the selected portion of the sets of interest using a property of the nodes associated with that given set of messages.

Figure 5:
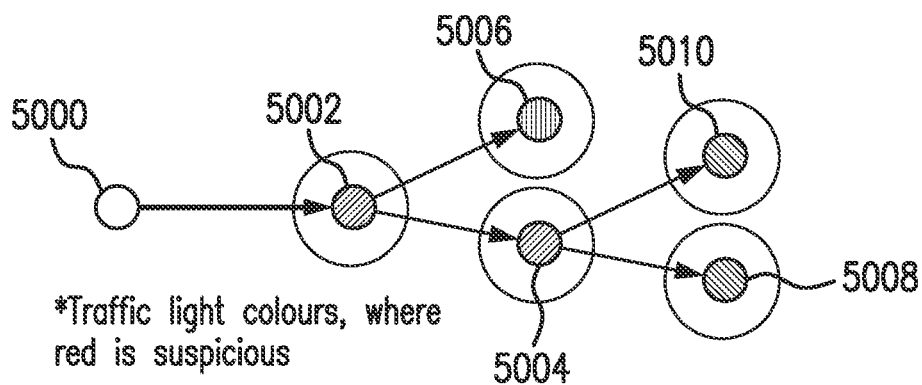
FIG. 5 illustrates an example set of messages in accordance with embodiments of the disclosure.

Consider, now, the example of FIG. 5 of the present disclosure. FIG. 5 illustrates an example set of messages in accordance with embodiments of the disclosure. Here, a set of messages is shown (where the set of messages is, in this example, a dispersion tree showing the dispersion of funds through a network of accounts). The set of messages (dispersion tree) in this example comprises a first account 5000 (the source account) a second account 5002 and a plurality of additional accounts 5004, 5006, 5008 and 5010. The messages sent between these accounts (illustrated, in this example, by the connections between the accounts) have been identified as relating to a single set of messages (dispersion) through the network.

Furthermore, the set of messages shown in this example has already been selected as a candidate set of messages by the selecting unit 3002 of apparatus 1000, because the initial transaction (the source message) between the source node 5000 and the second node 5002 exhibits a property which satisfies a given criterion set by the selecting node 3002. Indeed, in this example, the source message is an untrusted message which has been sent between two nodes (the source node 5000 and the second node 5002) which have not previously exchanged messages.

As the selecting unit 3002 has selected the set of messages as a candidate set of messages of interest, the generating unit 3004 of the present disclosure is configured to generate first values (or scores) for the nodes of the set of messages, the first values being indicative of the likelihood that the set of messages is a set of messages of interest.

The generating unit 3004 of apparatus 1000 is configured to generate the first values for the individual nodes of the set of messages based on a property of the nodes associated with the set of messages (i.e. the nodes 5000, 5002, 5004, 5006, 5008 and 5010 in this example). That is, in contrast to the selecting unit 3004 (which filters the sets of messages based on a property of the source message) the generating unit 3004 is configured to perform a more detailed analysis of the candidate sets of messages (being the sets of messages selected by the selecting unit 3002) based on a property of the nodes (or accounts) which are linked, or otherwise related, to the set of messages which has been selected by the selecting unit 3002.

In some examples of the present disclosure, the generating unit 3004 generates an individual score (i.e. first value) for all individual accounts in the set of messages.

In other examples, the generating unit may subsequently generate the first value as a combined or cumulative score for the accounts of the set of messages (using the individual values which have been generated for the accounts). In some examples, the generating unit 3004 excludes the source account (here, account 5000) from the processing when generating the first value. This is because the first account (the source account), being located at the start of the dispersion tree, may be a potential victim account (being a victim of an account take-over or the like). Accordingly, the properties of the potential victim account are not relevant to identifying whether or not the set of messages is a set of messages of interest. Rather, it is the properties of the other accounts in the set of messages (the potential mule accounts to which the funds stolen from the potential victim account have been transferred, for example) which are most relevant for identifying whether the set of messages is a set of messages of interest. Therefore, in the example of FIG. 5 of the present disclosure, the generating unit 3004 may generate the first value for the set of messages based on the properties of nodes 5002, 5004, 5006, 5008 and 5010. However, the present disclosure is not particularly limited in this regard, and the source node (node 5002) may be considered during the generation of the first value in some examples.

However, if the source node is to be excluded, then it may also be excluded when the individual values for the accounts are generated (even if no combined value is to be produced).

It will be appreciated that the properties of the accounts which are used, by the generating unit 3004, in order to generate the first value are not particularly limited in accordance with the present disclosure and will vary in accordance with the type of accounts and the network to which the embodiments of the disclosure are applied. As such, the above are only examples of the processing which may be applied by the generating unit.

In some examples, the property of the accounts used in generating the individual values for those accounts may relate to a behavioural property of the account being scored (this may include, for example the number of transactions, rate of transactions and/or the average value of the transactions which are made by an account). In examples, the behavioural properties of an account can be used in order to determine the level of risk that a certain account is engaged in fraudulent or other illicit activity, since there may be significant differences between the actions of a legitimate account and a fraudulent account. Indeed, as previously explained, a fraudulent account (such as a mule account which is used to rapidly disperse funds from fraudulent activity across a network) will often undergo a series of transactions in quick succession (with money entering the account from a first transaction (e.g. the source transaction from account 5000 to account 5002) being rapidly transferred to a number of additional accounts in the network (e.g. accounts 5004 to 5008)). Therefore, in examples, analysing the behavioural property of the account, or accounts, being associated with the set of messages provides a reliable way of determining the likelihood that the set of messages is a set of messages of interest.

Alternatively, the property of the account (or accounts) may relate to a historic profile of the account (this may include, for example, the amount of time the account has been established for, whether the account was opened as a personal and/or business account, for example). Again, often key differences may be present between legitimate accounts and accounts engaged in fraudulent activity (with accounts used for fraudulent activity displaying a peculiar historic profile (such as accounts used for fraudulent activity being opened, or reactivated, very recently). Therefore, the historic profile of the account, or accounts, associated with the set of messages provides a reliable way of determining the likelihood that the set of messages is a set of messages of interest.

Furthermore, the property of the accounts may relate to the type of relationships which have been maintained by the account (this may include, for example, how many new relationships with other accounts the account has established within a predetermined period of time, for example). Fraudulent accounts, or accounts engaged in fraudulent activity (such as money laundering) often engage in a series of transactions to accounts with which no previous relationship has been established. Therefore, analysis of the types of relationships held by the account or accounts being associated with the set of messages provides a reliable way of determining the likelihood that the set of messages is a set of message of interest.

However, there may be many more examples of types of properties of accounts which can be used, by the generating unit 3004, in order to produce a score indicative of the level of risk for the individual accounts which are associated with the set of messages. The types of properties of the accounts which are investigated in this manner will depend on the type of accounts which are being investigated and, more generally, the situation to which the embodiments of the disclosure are applied. As such, the present disclosure is not particularly limited to these illustrative examples.

Once the level of risk for the individual accounts has been determined, in some examples, the score for the individual accounts is passed directly to the identifying unit.

However, in certain examples, the generating unit 3004 can also use individual levels of risk (and/or the individual scores which have been determined) in order to produce a combined value for the set of messages as a whole (indicative of the level of risk that the set of messages is a set of messages of interest).

However, as previously described, in other examples, the individual scores which have been determined for the individual accounts of the set of messages can be passed directly to the identifying unit for further processing on an individual basis.

Now, in some examples situations, the generating unit 3004 may be configured to generate the individual scores for each of the individual accounts using a trained model. That is, the generating unit 3004 may use a model which has been trained on a set of training data to generate the individual scores for each of the individual accounts.

The trained model may be a machine learning model, deep learning model, or a neural network, for example. However, the present disclosure is not particularly limited in this regard, and any suitable trained model may be used as required.

The type of training data used to train the model may include historic data (being data of accounts and sets of messages which are known to be linked to activity of interest) or synthetic simulated data. In examples, the training data should comprise a wide number of different types of accounts and different sets of messages which are known to be related to activity of interest (such as fraudulent activity, for example). In this regard, use of simulated training data may increase the volume of data which is available and which can be used in order to train the model. Historic data may include data which has been constructed based on labelled observations collected from confirmed money laundering activities, for example.

The model to be trained (such as a neural network or any other type of machine learning algorithm) may then configured to use the training examples provided in the training data during a training phase in order to learn how to identify instances of fraudulent activity and/or sets of messages of interest.

In a specific example of a neural network, the neural network may be constructed of an input layer, an output layer, with a number of 'hidden' layers therebetween. Each of these layers may include a number of distinct nodes. The nodes of the input layer are each connected to the nodes of the first hidden layer. The nodes of the first hidden layer are then connected to the nodes of the following hidden layer or, in the event that there are no further hidden layers, the output layer. However, while, in this specific example, the nodes of the input layer are described as each being connected to the nodes of the first hidden layer, it will be appreciated that the present disclosure is not particularly limited in this regard. Indeed, other types of neural networks may be used in accordance with embodiments of the disclosure as desired depending on the situation to which embodiments of the disclosure are applied.

The nodes of the neural network each take a number of inputs and produce an output based on those inputs. The inputs of each node have individual weights applied to them. The inputs (such as the properties of the accounts) are then processed by the hidden layers using weights, which are adjusted during training. The output layer produces a prediction from the neural network (which varies depending on the input that was provided).

In examples, during training, adjustment of the weights of the nodes of the neural network is achieved through linear regression models. However, in other examples, logistic regression can be used during training Basically, training of the neural network is achieved by adjusting the weights of the nodes of the neural network in order to identify the weighting factors which, for the training input data provided, produce the best match to the actual data which has been provided.

In other words, during training, both the inputs and target outputs of the neural network may be provided to the model to be trained. The model then processes the inputs and compares the resulting output against the target data (i.e. sets of messages and/or individual accounts which are known to be linked to fraudulent activity). Differences between the output and the target data are then propagated back through the neural network, causing the neural network to adjust the weights of the respective nodes of the neural network. However, in other examples, training can be achieved without the outputs, using constraints of the system during the optimization process.

Once trained, new input data (i.e. new data of accounts related to a set of messages) can then be provided to the input layer of trained model, which will cause the trained model to generate (on the basis of the weights applied to each of the nodes of the neural network during training) a predicted output for the given input data (being a prediction of the accounts and/or sets of messages which are likely to be linked to fraudulent activity).

However, it will be appreciated that the neural network described here is not particularly limiting to the present disclosure. More generally, any type of machine learning model or machine learning algorithm can be used in accordance with embodiments of the disclosure.

That is, any suitable trained model may be used in order to generate a score for the individual accounts in each set of messages (indicating the likelihood that the account is fraudulent) in accordance with embodiments of the disclosure. Moreover, the present disclosure is not particularly limited to the use of a trained model, and may use any processing which uses a property of the accounts in order to identify the level of risk for the individual nodes or account of the set of messages.

Consider now, again, the example of FIG. 5 of the present disclosure.

In this example, the generating unit 3004 may, optionally, discount the source account (being the first account in the set of messages) from the generation of the first values, since the source account is likely to be a victim account (if the set of messages does indeed related to fraudulent activity). However, the generating unit 3004 of the present disclosure may use at least one property of the other accounts related to the set of messages in order to produce a score for each of those individual accounts (the score being indicative of the risk factor of each individual account).

Accordingly, in this specific example, the generating unit 3004 first generates a score for the second account 5002. The second account 5002, in this example, is considered to be a high risk account as it exhibits one or more properties which are linked or otherwise associated with fraudulent (or high risk) accounts. The account 5002 may have recently undergone a very high rate of transactions, for example. As such, the generating unit 3004 assigns a score to this second account 5002 commensurate with the level of risk which has been determined.

Then, the generating unit 3004 generates a score for each of the other accounts which are associated with the set of messages. Here, the account 5004 is also determined, by the generating unit 3004, to be a high risk account. However, accounts 5006 and 5008 are determined, by the generating unit 3004, to exhibit less risky behaviour than account 5004. This may be because the rate of transactions for these accounts is lower than for accounts 5002 and 5004, for example. Therefore, the generating unit 3004 assigns a score to these accounts commensurate with the level of risk which has been determined.

Finally, in this example, the generating unit 3004 determines that account 5010 is a low risk account, which does not exhibit any of the properties which are often associated with a high risk (e.g. potentially fraudulent) account. Therefore, a low score is assigned by generating unit 3004 to account 5010.

In this manner, the generating unit generates a first value for the individual accounts associated with the set of messages. The individual scores for the individual accounts of the set of messages may be passed directly to the identifying unit.

In some examples, once the scores for the individual accounts associated with the set of messages has been produced, the generating unit 3004 generates a first value (being a combined or cumulative score for the set of messages). In examples, the generating unit 3004 may generate this first value by adding the individual scores which have been produced for the accounts associated with the set of messages. However, the present disclosure is not particularly limited in this regard, and any suitable operation for producing the first value based on the score which has been produced for the individual accounts in the set of messages may be used—if a combined or cumulative score for the set of messages is required.

In this example, the set of messages illustrated in FIG. 5 of the present disclosure is considered to be a high risk set of messages, as a number of the individual accounts associated with the set of messages have been identified as high risk accounts.

The generating unit 3004 may then store the first values which have been determined for the individual accounts of the set of messages in an internal or external storage unit or, alternatively, pass the value directly to the identifying unit 3006.

Once the value has been produced for the set of messages, the generating unit 3004 may then generate corresponding values for the nodes of all other candidate sets of messages (being those sets of messages which have been selected by the selecting unit 3002 as potentially relating to a set of messages of interest).

Of course, while the individual steps performed by the generating unit 3004 have been described in sequence, it will be appreciated that the present disclosure is not particularly limited in this regard. Indeed, a number of the above described processing steps performed by generating unit 3004 may, alternatively, be applied or performed in parallel. This further improves the processing efficiency of apparatus 1000 when identifying sets of messages of interest.

In some examples, the information regarding the accounts used in order to generate the first values (i.e. the properties of the accounts) may be received by the receiving unit 3000 of the apparatus 1000 in the information of the plurality of sets of messages which have been exchanged in the network. Alternatively, or in addition, the generating unit 3004 may use the information which has been received (such as the unique identifiers of the accounts associated with a set of messages) in order to access an internal and/or external database in order to retrieve further information about the accounts, including the properties of the accounts, for example.

Furthermore, in some examples, a binary classification may be produced by generating unit 3004 for each of the individual accounts which are associated with the set of messages. That is, for each account, the generating unit 3004 may generate a score, such as a probability value (ranging between 0 and 1, for example) that the account is a suspicious account. Then, if the score which is generated for that account exceeds a certain predetermined probability threshold (e.g. 0.7, for example) the account will be identified as a suspicious account (having a high probability of being linked to suspicious activity). In contrast, if the score which is generated for that account is below this certain predetermined probability threshold, the account will be identified as an account which does not strongly display suspicious activity.

In some examples, if a combined value is to be produced for the set of messages as a whole, the combined value may then be based on a normalised number of the accounts in the set of messages which have been identified as suspicious accounts (with normalisation being applied to account for the size of the set of messages).

In this manner, the generating unit 3004 may accurately and reliably generate a value, indicative of the level of risk for the individual accounts (or individual nodes) associated with a given set of messages, for all of the individual sets of messages which have been selected by the selecting unit 3002 from amongst the plurality of sets of messages which have been received.

<Identifying Unit>

As described with reference to FIG. 2 of the present disclosure, the identifying unit 3006 of the apparatus 1000 is configured to configured to identify at least one set of messages of the selected portion of the plurality of sets of messages as a set of messages of interest using the individual first values which have been generated for the selected portion of the sets of messages.

In examples, a set of messages (such as a dispersion tree produced in accordance with the teachings of published patent applications EP3629273A1 and EP362955A1) will be identified as a suspicious dispersion tree (or a dispersion tree of interest) when certain transaction criteria and account criteria for that tree have been met. This combination of transaction based and account based criteria enables a significant improvement in the reliability and efficiency of apparatus 1000 in the identification of suspicious trees. In particular, the identifying unit 3006 will only identify a dispersion tree as a dispersion tree of interest when that tree has been selected by the selecting unit 3002 (based on a transaction based criterion) and when the first values which has been produced by the generating unit 3004 for that selected tree (based on an account based criterion) indicate that the dispersion tree is a suspicious (or high risk) tree.

In some examples, the identifying unit 3006 of apparatus 1000 may be configured to identify at least one set of messages as a set of messages of interest when the first values for a number of the accounts of that set of messages exceed a predetermined threshold value. That is, the identifying unit 3006 may receive, either directly or indirectly, the first values which has been generated by generating unit 3004 for each of the sets of messages which have been selected by selecting unit 3002. Then, from amongst these selected sets of messages, any set of messages having accounts for which the first value is above a predetermined level will be selected as a set of messages of interest. In some examples, if a predetermined number of the accounts of the set of messages have an individual first value above the predetermined threshold then that set of message is identified as suspicious. The predetermined number may be normalised based on the number of accounts involved in the set of messages. Furthermore, the predetermined number may vary depending on the situation to which the embodiments of the disclosure are applied.

The specific value of the predetermined threshold used for the detection of suspicious trees and/or suspicious accounts is not particularly limited in accordance with the present disclosure, and may, optionally, vary depending on the situation to which the embodiments of the disclosure are applied and/or the desired sensitivity of the identification process. Indeed, the predetermined threshold value may be set based on testing with a labelled set of observations that were collected from confirmed money laundering activity or the like. The level of the threshold value should be set such that suspicious accounts and suspicious sets of messages are reliably identified while maintaining a low level of false-positive rates during the identification of sets of messages of interest.

In some examples, where the first values produced by the generating unit 3004 relate to a probability between 0 and 1 that the account is suspicious (i.e. is related to fraudulent, or otherwise illicit, activity) the predetermined threshold value may be set to a certain level such as 0.7. Then any set of messages with a number of accounts having a first value above this threshold value will be identified as a set of messages of interest. However, the present disclosure is in no way limited to this specific example.

The identifying unit 3006 of apparatus 1000 may be configured to produce a notification or other form of output message in order to warn an external party (such as an investigator or the like) that a tree (e.g. set of messages) has been identified as suspicious. The external party can then take further steps related to that suspicious set of messages as required. However, in other examples, the identifying unit 3006 may take further action upon identification of a set of messages as being a set of messages of interest. In particular, the identifying unit 3006 may perform certain additional processing to block further messages (or transactions) to and/or from accounts associated with the set of messages of interest until further investigation into the set of messages has been performed. In this manner, fraudulent activity in the network can be reliably and efficiently disrupted in substantially real-time.

In some examples, only high scoring (high risk) accounts from a suspicious tree will be alerted or notified in this manner. This ensures that low scoring (low risk) legitimate accounts inadvertently linked to a suspicious dispersion tree (suspicious set of messages) are not unnecessarily restricted. Accordingly, the identifying unit 3006 can ensure that the false-positive rate of detection of suspicious activity remains low.

The identifying unit 3006 of the present disclosure may, in some examples, be further configured to perform additional processing on the sets of messages which have been selected by the selecting unit 3002 and which have first values (generated by the generating unit 3004) above a certain predetermined threshold value prior to identifying the sets of messages as sets of messages of interest.

In particular, in some examples, the identifying unit 3006 of apparatus 1000 may further be configured to determine a set of messages as a set of messages of interest using the first values for the set of messages and a property of the set of messages. In other words, in addition to the message-based criterion of the selecting unit 3002 and the account-based criterion of the generating unit 3004, the identifying unit 3006 may apply one or more additional criteria based on additional properties of the set of messages (as a whole) itself.

Indeed, in some examples, the property of the set of messages may be that a target node (to which the source message was sent from the source node) has an individual first value above a predetermined threshold and that at least one further node to which the target node sent a subsequent message has an individual value above a predetermined threshold.

In examples, the individual value may be the same as the individual score generated by the generating unit 3004 for those accounts associated with each set of messages. However, in other examples, the individual value may be a further individual value (separate from the individual score) produced by the identifying unit 3006 for those accounts (with higher risk accounts being provided with a higher score commensurate with that risk by the identifying unit 3006). In this case, the identifying unit 3006 may produce the individual score for the individual accounts using a trained model in a manner the same as described for the generating unit 3004 with reference to FIG. 5 of the present disclosure.

This additional consideration performed by the identifying unit 3006 prior to identification of sets of messages of interest, imposes a requirement that the high scoring accounts (high risk accounts) for a set of messages are located at the start of the set of messages. In particular, this is because it has been identified based on confirmed fraudulent activity (including money laundering activity) that suspicious behaviour most often occurs at the beginning of a set of messages. Therefore, if the high risk accounts or activity are not located at the start of the set of messages, it is very likely that the dispersion tree itself is not suspicious (with the high risk accounts later in the dispersion tree likely displaying certain high risk activity either incidentally and/or by chance). In other words, accounts displaying certain high behaviours are not likely to be accounts linked to fraudulent activity if those accounts are not actually located at the start of the dispersion tree.

Figure 6:
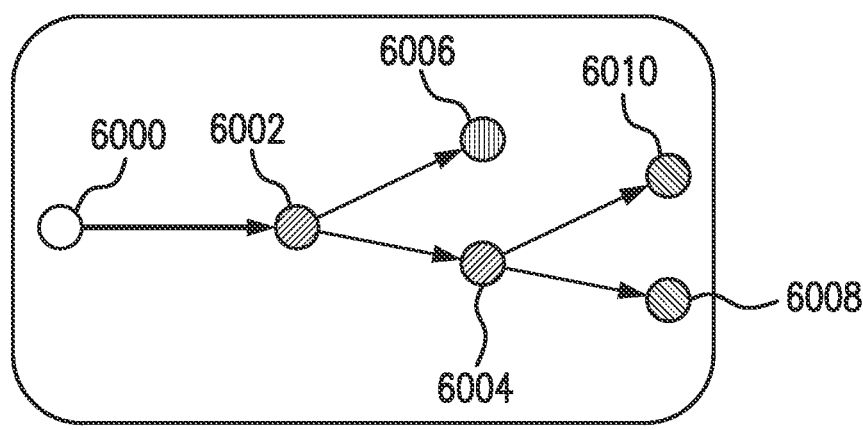
FIG. 6 illustrates an example set of messages in accordance with embodiments of the disclosure.

Consider, now, the example situation illustrated in FIG. 6 of the present disclosure. In this example, a set of messages of interest in accordance with embodiments of the disclosure is shown. In this set of messages, the source node 6000 sends a source message to the second node 6002. The second node, 6002, then sends subsequent messages to node 6004 and 6006. Furthermore, node 6004 sends messages to each of node 6008 and 6010 in the network.

This example set of messages has been selected by the selecting unit 3002 as one of the selected portion of sets of messages (being a candidate set of messages of interest). Moreover, the values generated by the generating unit 3004 for the nodes of the set of messages are above the predetermined threshold value set by the identifying unit 3006 (for a number of the accounts of the set of messages). Therefore, there is a strong likelihood that the set of messages is a set of messages of interest (being linked to certain activity (such as money laundering or the like)).

Now, in this example, the identifying unit 3006 applies certain additional processing to verify whether the individual suspicious accounts (which have led to the set of messages having a value above the predetermined threshold) are located at the beginning of the set of messages. That is, in this example, the identifying unit 3006 is configured to determine whether the second node 6002 (i.e. the target node to which the source message was sent from the source node 6000) has an individual value above a predetermined threshold and at least one further node to which the target node sent a subsequent message (i.e. either node 6004 and/or node 6008) also has an individual value above a predetermined threshold.

Here, in this example, the identifying unit 3006 uses the individual scores which were generated by the generating unit 3004 for the nodes as the individual values for the nodes. This enables the identifying unit 3006 to efficiently identify whether the suspicious nodes and suspicious activity is located at the beginning of the set of messages.

In this example, the score which is produced for node 6002 is such that the node 6002 is identified as a suspicious node. Accordingly, the requirement that the second node 6002 (i.e. the first degree node, after the source node) has an individual value above a predetermined threshold is met.

Furthermore, node 6004 is identified as a suspicious account based on the score which has been produced by the generating unit 3004 for that node. Therefore, the requirement that at least one node to which the second node 6002 sends a message (i.e. at least one second degree node, after the source node) in turn has an individual value above the predetermined threshold is also met. In this regard, it does not matter that node 6006 has an individual score which is below the threshold value. That is, provided that at least one node to which the second node has an individual value above the predetermined threshold, the requirement will be met.

As such, in this example, since the identifying unit 3006 identifies that the activity of interest occurs at the beginning of the set of messages, the set of messages will be identified as a set of messages of interest.

It has been found that this additional processing performed by the identifying unit 3006 when identifying a set of messages as a set of messages of interest proves highly effective in the identification of sets of messages of interest. Indeed, this additional processing may provide an overall reduction of sets of messages of 99.2% of the original sets of messages which were received by the receiving unit 3000, while detecting over 60% of the suspicious sets of messages. Accordingly, this additional processing further improves the processing and storage efficiency and reliability of apparatus 1000 when identifying sets of messages of interest.

However, the present disclosure is not particularly limited to this additional tree-based criterion as described with reference to FIG. 6 of the present disclosure. Indeed, the identifying unit 3006 may, in examples, identify the sets of messages of interest based only on those accounts selected by the selecting unit 3002 and the individual values generated by the generating unit 3004. Even, in some examples, the identification of the set of messages of interest may be based on a combined first value which is generated for the set of messages as a whole. However, the present disclosure is not limited in this regard.

In this manner, the identifying unit 3006 of apparatus 1000 identifies sets of messages of interest from amongst the sets of messages received by received unit 3000.

Advantageous Technical Effects

According to embodiments of the disclosure, individual sets of messages of interest can be identified within a network, from amongst the sets of messages exchanged within the network, with increased processing efficiency and reduced computational effort (with reduction in both processing and memory requirements). Furthermore, the speed at which sets of messages within the network can be identified as sets of messages of interest (being linked to fraudulent, or potentially fraudulent, activity, for example) is significantly increased, such that sets of messages of interest can be identified in an substantially real time environment. Suspicious activity in the network can therefore be identified more efficiently and with higher speed, enabling illicit activity in the network to be disrupted more effectively.

More specifically, in the example described with reference to FIG. 2 of the present disclosure, only suspicious (high-scoring) accounts that are part of suspicious dispersion trees (sets of messages) are detected and used to identity dispersion trees (sets of messages) of interest. This reduces the false-positive rate, as suspicious accounts not related to suspicious trees are discounted, and improves the computational effort. Indeed, owing to the efficiency of the identification process, the processing of the present disclosure may be performed in a substantially real-time environment, enabling suspicious sets of messages to be identified before further transactions are even authorised (e.g. by a bank). This improves the ability to disrupt fraudulent activity and retrieve funds which have been stolen.

Of course, it will be appreciated that the present disclosure is not limited to the above identified technical effects. Rather, other technical effects will be apparent to the skilled person when reading the disclosure.

<Method>

Figure 7:
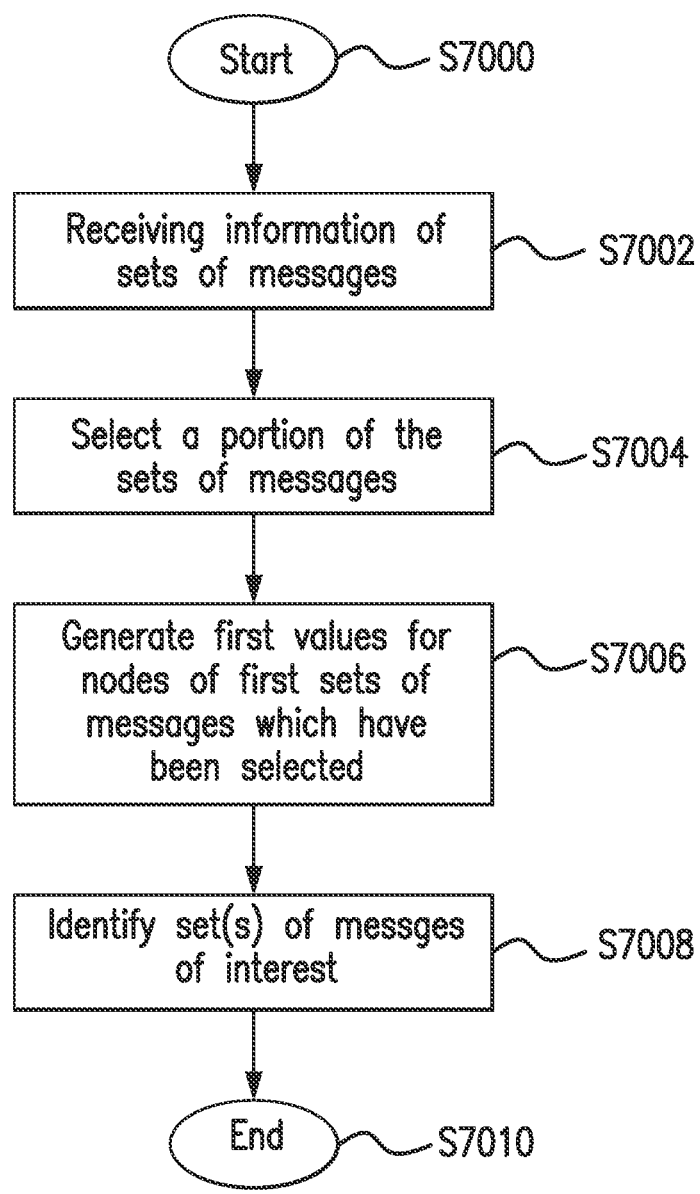
FIG. 7 illustrates an example method in accordance with embodiments of the disclosure.

Furthermore, a method of identifying a set of messages of interest in a network is provided in accordance with embodiments of the disclosure. FIG. 7 illustrates an example method of identifying a set of messages of interest.

The example method illustrated in FIG. 7 of the present disclosure starts at step S7000 and proceeds to step S7002.

In step S7002, the method comprises receiving information of a plurality of sets of messages which have been exchanged by nodes in a network.

Once this information has been received, in whole or in part, the method proceeds to step S7004.

In step S7004, the method comprises selecting a portion of the plurality of sets of messages which have been received using a property of a source message of each set of messages of the plurality of sets of messages.

Then the method proceeds to step S7006.

In step S7006, the example method illustrated in FIG. 7 of the present disclosure comprises generating individual first values for the nodes of each set of messages of the selected portion of the plurality of sets of messages using a property of the nodes associated with each set of messages.

Once the first values for the sets of messages has been generated, the method proceeds to step S7008.

In step S7008, the method comprises identifying at least one set of messages of the selected portion of the plurality of sets of messages as a set of messages of interest using the individual first values which have been generated for the selected portion of the sets of messages.

Then, the method proceeds to, and ends with, step S7010.

Of course, it will be appreciated that a number of the modifications to the example method illustrated in FIG. 7 of the present disclosure can be made in accordance with embodiments of the disclosure. In particular, it will be appreciated that while the steps of FIG. 7 of the present disclosure are illustrated in a certain example order, they can, alternatively, be performed in an order different to that shown in FIG. 7 of the present disclosure.

As an example, it will be understood that a number of the steps (such as steps S7002 and S7004 and/or steps S7004 and S7006) may be performed sequentially or, alternatively, may be performed in parallel for each set of messages. Indeed, in some examples, once a set of messages has been selected and the first values for that set of messages have been generated, that message can be identified as a set of messages of interest even before the processing for the other sets of messages of the plurality of sets of messages has been completed.

In addition, certain embodiments of the disclosure may be arranged in accordance with the following numbered clauses:

1. Apparatus for identifying a set of messages of interest in a network, the apparatus comprising circuitry configured to:
   receive information of a plurality of sets of messages which have been exchanged by nodes in a network;
   select a portion of the plurality of sets of messages which have been received using a property of a source message of each set of messages of the plurality of sets of messages;
   generate individual first values for the nodes of each set of messages of the selected portion of the plurality of sets of messages using a property of the nodes associated with each set of messages; and
   identify at least one set of messages of the selected portion of the plurality of sets of messages as a set of messages of interest using the individual first values which have been generated for the selected portion of the sets of messages.

2. The apparatus according to any preceding Clause, wherein the information of the plurality of sets of messages includes at least one of a unique identifier associated with each of the sets of messages, a unique identifier of the nodes associated with each of the sets of messages and/or a unique identifier of messages associated with each of the sets of messages.

3. The apparatus according to any preceding Clause, wherein the apparatus is configured to select a portion of the plurality of sets of messages which have been received by selecting sets of messages where a value associated the source message of each set of messages exceeds a first predetermined threshold.

4. The apparatus according to any preceding Clause, wherein the apparatus is configured to select a portion of the plurality of sets of messages which have been received by selecting sets of messages where the source message is exchanged between two nodes which have not previously exchanged messages and/or where an earliest message exchanged between the two nodes occurred within a predetermined interval of time before the source message of the set of messages.

5. The apparatus according to any preceding Clause, wherein the apparatus is configured to generate a combined first value for each of the individual nodes associated with the set of messages.

6. The apparatus according to any preceding Clause, wherein the apparatus is configured to generate the individual first values for the nodes of each set of messages using a trained model.

7. The apparatus according to Clause 6, wherein the trained model is trained in order to generate the first value using a behaviour of the nodes in the network as a property of the nodes associated with each set of messages.

8. The apparatus according to Clause 6, wherein the trained model is a machine learning model, a deep learning model and/or a neural network.

9. The apparatus according to Clause 8, wherein the behaviour includes at least a number of messages sent by the nodes, a rate of messages sent by the nodes, a value of the messages sent by the nodes, an average age of the relationship between nodes and/or a number of messages sent to nodes to which a node has not previously sent messages.

10. The apparatus according to any preceding Clause, wherein the apparatus is further configured to determine a set of messages as a set of messages of interest using the first values which have been generated for the set of messages and a property of the set of messages.

11. The apparatus according to Clause 5, wherein the apparatus is configured to identify at least one set of messages as a set of messages of interest when the combined first value for that set of messages exceeds a predetermined threshold value.

12. The apparatus according to Clause 10, wherein the property of the set of messages is that a target node to which the source message was sent has an individual first value above a predetermined threshold and at least one node to which the target node sent a message has an individual first value above a predetermined threshold.

13. The apparatus according to any preceding Clause, wherein the nodes are accounts in a banking network and the messages are transactions exchanged between the accounts in the banking network.

14. Method of identifying a set of messages of interest in a network, the method comprising controlling circuitry to perform the steps of:
   receiving information of a plurality of sets of messages which have been exchanged by nodes in a network;
   selecting a portion of the plurality of sets of messages which have been received using a property of a source message of each set of messages of the plurality of sets of messages;
   generating individual first values for each of the nodes of each set of messages of the selected portion of the plurality of sets of messages using a property of the nodes associated with each set of messages; and
   identifying at least one set of messages of the selected portion of the plurality of sets of messages as a set of messages of interest using the individual first values which have been generated for the selected portion of the sets of messages.

15. Computer program product comprising instructions which, when the instructions are implemented by a computer, cause the computer to perform the steps of:
   receiving information of a plurality of sets of messages which have been exchanged by nodes in a network;
   selecting a portion of the plurality of sets of messages which have been received using a property of a source message of each set of messages of the plurality of sets of messages;
   generating individual first values for each of the nodes of each set of messages of the selected portion of the plurality of sets of messages using a property of the nodes associated with each set of messages; and
   identifying at least one set of messages of the selected portion of the plurality of sets of messages as a set of messages of interest using the individual first values which have been generated for the selected portion of the sets of messages.

It will further be appreciated that embodiments of the present disclosure may also be applied to the identification of sets of messages of interest in any suitable network as desired (and are not particularly limited to the example of sets of messages (or transactions) within a banking network). For example, in embodiments of the present disclosure may be applied to the identification of sets of messages of interest in other networks such as those related to a messaging service such as an email account or the like. Moreover, embodiments of the present disclosure may also be used in order to detect sets of messages of interest in social media accounts or the like. Indeed, the present disclosure is not particularly limited to these further examples and may, alternatively, be applied to any suitable network. In fact, it will be understood that technical effects, including for example an increased processing efficiency in the detection of messages of interest, may be achieved by embodiments of the disclosure regardless of the specific type of network to which the embodiments of the disclosure are applied.

Furthermore, while numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. Apparatus for identifying a set of messages of interest in a network, the apparatus comprising circuitry configured to:
receive information of a plurality of sets of messages which have been exchanged by nodes in a network;
select a portion of the plurality of sets of messages which have been received using a property of a source message of each set of messages of the plurality of sets of messages;
generate, individual first values for the nodes of each set of messages of the selected portion of the plurality of sets of messages using a property of the nodes associated with each set of messages; and
identify at least one set of messages of the selected portion of the plurality of sets of messages as a set of messages of interest using the individual first values which have been generated for the selected portion of the sets of messages;
wherein the apparatus is configured to generate the individual first values for the nodes of each set of messages using a trained model;
wherein the trained model is trained in order to generate the first value using a behaviour of the nodes in the network as a property of the nodes associated with each set of messages;
wherein the trained model is a machine learning model, a deep learning model and/or a neural network;
wherein the behaviour includes at least a number of messages sent by the nodes, a rate of messages sent by the nodes, a value of the messages sent by the nodes, an average age of the relationship between nodes and/or a number of messages sent to nodes to which a node has not previously sent messages.

2. The apparatus according to claim 1, wherein the information of the plurality of sets of messages includes at least one of a unique identifier associated with each of the sets of messages, a unique identifier of the nodes associated with each of the sets of messages and/or a unique identifier of messages associated with each of the sets of messages.

3. The apparatus according to claim 1, wherein the apparatus is configured to select a portion of the plurality of sets of messages which have been received by selecting sets of messages where a value associated the source message of each set of messages exceeds a first predetermined threshold.

4. The apparatus according to claim 1, wherein the apparatus is configured to select a portion of the plurality of sets of messages which have been received by selecting sets of messages where the source message is exchanged between two nodes which have not previously exchanged messages and/or where an earliest message exchanged between the two nodes occurred within a predetermined interval of time before the source message of the set of messages.

5. The apparatus according to claim 1, wherein the apparatus is configured to generate a combined first value for each of the individual nodes associated with the set of messages.

6. The apparatus according to claim 5, wherein the apparatus is configured to identify at least one set of messages as a set of messages of interest when the combined first value for that set of messages exceeds a predetermined threshold value.

7. The apparatus according to claim 1, wherein the apparatus is further configured to determine a set of messages as a set of messages of interest using the first values which have been generated for the set of messages and a property of the set of messages.

8. The apparatus according to claim 1, wherein the nodes are accounts in a banking network and the messages are transactions exchanged between the accounts in the banking network.

9. Apparatus for identifying a set of messages of interest in a network, the apparatus comprising circuitry configured to:

receive information of a plurality of sets of messages which have been exchanged by nodes in a network;

select a portion of the plurality of sets of messages which have been received using a property of a source message of each set of messages of the plurality of sets of messages;

generate, individual first values for the nodes of each set of messages of the selected portion of the plurality of sets of messages using a property of the nodes associated with each set of messages; and identify at least one set of messages of the selected portion of the plurality of sets of messages as a set of messages of interest using the individual first values which have been generated for the selected portion of the sets of messages;

wherein the apparatus is further configured to determine a set of messages as a set of messages of interest using the first values which have been generated for the set of messages and a property of the set of messages;

wherein the property of the set of messages is that a target node to which the source message was sent has an individual first value above a predetermined threshold and at least one node to which the target node sent a message has an individual first value above a predetermined threshold.

10. The apparatus according to claim 9, wherein the information of the plurality of sets of messages includes at least one of a unique identifier associated with each of the sets of messages, a unique identifier of the nodes associated with each of the sets of messages and/or a unique identifier of messages associated with each of the sets of messages.

11. The apparatus according to claim 9, wherein the apparatus is configured to select a portion of the plurality of sets of messages which have been received by selecting sets of messages where a value associated the source message of each set of messages exceeds a first predetermined threshold.

12. The apparatus according to claim 9, wherein the apparatus is configured to select a portion of the plurality of sets of messages which have been received by selecting sets of messages where the source message is exchanged between two nodes which have not previously exchanged messages and/or where an earliest message exchanged between the two nodes occurred within a predetermined interval of time before the source message of the set of messages.

13. The apparatus according to claim 9, wherein the apparatus is configured to generate a combined first value for each of the individual nodes associated with the set of messages.

14. The apparatus according to claim 13, wherein the apparatus is configured to identify at least one set of messages as a set of messages of interest when the combined first value for that set of messages exceeds a predetermined threshold value.

15. The apparatus according to claim 9, wherein the nodes are accounts in a banking network and the messages are transactions exchanged between the accounts in the banking network.

16. Method of identifying a set of messages of interest in a network, the method comprising controlling circuitry to perform the steps of:

receiving information of a plurality of sets of messages which have been exchanged by nodes in a network;

selecting a portion of the plurality of sets of messages which have been received using a property of a source message of each set of messages of the plurality of sets of messages;

generating individual first values for each of the nodes of each set of messages of the selected portion of the plurality of sets of messages using a property of the nodes associated with each set of messages;

identifying at least one set of messages of the selected portion of the plurality of sets of messages as a set of messages of interest using the individual first values which have been generated for the selected portion of the sets of messages; and generating the individual first values for the nodes of each set of messages using a trained model, wherein the trained model is trained in order to generate the first value using a behaviour of the nodes in the network as a property of the nodes associated with each set of messages, wherein the behaviour includes at least a number of messages sent by the nodes, a rate of messages sent by the nodes, a value of the messages sent by the nodes, an average age of the relationship between nodes and/or a number of messages sent to nodes to which a node has not previously sent messages.

17. A non-transitory computer-readable storage medium having computer-executable instructions stored thereon, the computer-executable instructions, when executed by a processor, cause the processor to perform the operations of:

receiving information of a plurality of sets of messages which have been exchanged by nodes in a network;

selecting a portion of the plurality of sets of messages which have been received using a property of a source message of each set of messages of the plurality of sets of messages;

generating individual first values for each of the nodes of each set of messages of the selected portion of the plurality of sets of messages using a property of the nodes associated with each set of messages; and identifying at least one set of messages of the selected portion of the plurality of sets of messages as a set of messages of interest using the individual first values which have been generated for the selected portion of the sets of messages, wherein generating the individual first values for the nodes of each set of messages involves using a trained model, wherein the trained model is trained in order to generate the first value using a behaviour of the nodes in the network as a property of the nodes associated with each set of messages, wherein the behaviour includes at least a number of messages sent by the nodes, a rate of messages sent by the nodes, a value of the messages sent by the nodes, an average age of the relationship between nodes and/or a number of messages sent to nodes to which a node has not previously sent messages.

* * * * *